US012614256B2

(12) United States Patent
Sezginer et al.

(10) Patent No.: US 12,614,256 B2
(45) Date of Patent: Apr. 28, 2026

(54) SHOT NOISE REDUCTION USING FRAME AVERAGING

(71) Applicant: KLA Corporation, Milpitas, CA (US)

(72) Inventors: Abdurrahman Sezginer, Monte Sereno, CA (US); Patrick McBride, Davis, CA (US); Indrasen Bhattacharya, Milpitas, CA (US); Robert M. Danen, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 347 days.

(21) Appl. No.: 18/128,184

(22) Filed: Mar. 29, 2023

(65) Prior Publication Data

US 2023/0351553 A1 Nov. 2, 2023

Related U.S. Application Data

(60) Provisional application No. 63/326,268, filed on Mar. 31, 2022.

(51) Int. Cl.
| | |
|---|---|
| *G06T 5/70* | (2024.01) |
| *G06T 5/20* | (2006.01) |
| *G06T 7/00* | (2017.01) |
| *G06V 20/50* | (2022.01) |

(52) U.S. Cl.
CPC .................. *G06T 5/70* (2024.01); *G06T 5/20* (2013.01); *G06T 7/001* (2013.01); *G06V 20/50* (2022.01); *G06T 2207/20224* (2013.01); *G06T 2207/30148* (2013.01)

(58) Field of Classification Search
None
See application file for complete search history.

(56) References Cited

U.S. PATENT DOCUMENTS

| | | |
|---|---|---|
| 6,987,892 B2 | 1/2006 | Edgar |
| 7,877,722 B2 | 1/2011 | Duffy et al. |
| 8,126,255 B2 | 2/2012 | Bhaskar et al. |
| (Continued) | | |

FOREIGN PATENT DOCUMENTS

| | | |
|---|---|---|
| JP | 2004327950 A | 11/2004 |
| JP | 4789630 B2 | 10/2011 |
| (Continued) | | |

OTHER PUBLICATIONS

Korean Intellectual Property Office, International Search Report and Written Opinion for International Application No. PCT/US2023/017004, Jul. 12, 2023, 9 pages.

(Continued)

*Primary Examiner* — Randolph I Chu
(74) *Attorney, Agent, or Firm* — Suiter Swantz IP

(57) ABSTRACT

An inspection system includes a controller including one or more processors configured to execute program instructions. The program instructions cause the one or more processors to receive at least a first portion of a first set of repeat swaths of a first scan path of a sample. The program instructions cause the one or more processors to generate an image by averaging the first portion of the first set of repeat swaths. Averaging the first portion of the first set of repeat swaths reduces a noise in the image. The program instructions cause the one or more processors to detect one or more defects in an inspection region of the sample using the image.

32 Claims, 8 Drawing Sheets

302a IMAGE

302b IMAGE $\sigma = 8.5147$ GL $\sigma = 8.5483$ GL   AVERAGE

302c IMAGE

302d IMAGE $\sigma = 8.5721$ GL $\sigma = 8.5634$ GL

304 AVG IMAGE

AVERAGE $\sigma = 4.324$ GL

(56) References Cited

U.S. PATENT DOCUMENTS

| | | | |
|---|---|---|---|
| 8,611,639 B2 | 12/2013 | Kulkarni et al. | |
| 9,183,624 B2 | 11/2015 | Karsenti et al. | |
| 9,262,821 B2 | 2/2016 | Shifrin et al. | |
| 9,518,934 B2 | 12/2016 | Chen et al. | |
| 9,613,411 B2 | 4/2017 | Konuru et al. | |
| 9,619,876 B2 | 4/2017 | Huang et al. | |
| 10,346,740 B2 | 7/2019 | Zhang et al. | |
| 10,395,358 B2 | 8/2019 | Brauer et al. | |
| 10,440,299 B2 | 10/2019 | Lin et al. | |
| 10,504,213 B2 | 12/2019 | Brauer | |
| 10,533,848 B2 | 1/2020 | Shchegrov et al. | |
| 10,535,131 B2 | 1/2020 | Maher et al. | |
| 10,557,802 B2 | 2/2020 | Brauer et al. | |
| 10,599,944 B2 | 3/2020 | Lee et al. | |
| 10,801,968 B2 | 10/2020 | Brauer | |
| 10,923,317 B2 | 2/2021 | Huang et al. | |
| 10,943,838 B2 | 3/2021 | Hoo et al. | |
| 11,010,885 B2 | 5/2021 | Brauer et al. | |
| 11,120,546 B2 | 9/2021 | Brauer et al. | |
| 11,270,430 B2 | 3/2022 | Sezginer et al. | |
| 11,415,526 B2 | 8/2022 | Duffy et al. | |
| 11,415,531 B2 | 8/2022 | Gaind et al. | |
| 11,416,982 B2 | 8/2022 | Brauer et al. | |
| 11,494,924 B2 | 11/2022 | Noormofidi et al. | |
| 11,550,309 B2 | 1/2023 | Soltanmohammadi et al. | |
| 11,551,348 B2 | 1/2023 | Zhang et al. | |
| 2003/0012442 A1* | 1/2003 | Hashimoto | G06T 5/75 382/218 |
| 2004/0196453 A1 | 10/2004 | Some | |
| 2008/0165345 A1 | 7/2008 | Hill | |
| 2008/0291454 A1 | 11/2008 | Cai et al. | |
| 2008/0317358 A1 | 12/2008 | Bressan et al. | |
| 2009/0080759 A1 | 3/2009 | Bhaskar et al. | |
| 2010/0329540 A1 | 12/2010 | Bhaskar et al. | |
| 2011/0314049 A1 | 12/2011 | Poirier et al. | |
| 2012/0308112 A1 | 12/2012 | Hu et al. | |
| 2015/0006103 A1 | 1/2015 | Wel et al. | |
| 2017/0116727 A1 | 4/2017 | Kim et al. | |
| 2018/0082415 A1 | 3/2018 | Sezginer et al. | |
| 2018/0144442 A1 | 5/2018 | Brauer | |
| 2019/0033728 A1 | 1/2019 | Takagi et al. | |
| 2019/0122913 A1 | 4/2019 | Lauber et al. | |
| 2019/0130551 A1* | 5/2019 | Chen | G06T 7/001 |
| 2019/0287232 A1 | 9/2019 | Brauer | |
| 2020/0025689 A1 | 1/2020 | Gaind et al. | |
| 2020/0193588 A1 | 6/2020 | Brauer et al. | |
| 2021/0010945 A1 | 1/2021 | Brauer et al. | |
| 2021/0109041 A1 | 4/2021 | Gaind et al. | |
| 2021/0201460 A1 | 7/2021 | Gong et al. | |
| 2021/0366103 A1 | 11/2021 | Zhang et al. | |
| 2021/0381989 A1 | 12/2021 | Hiroi et al. | |
| 2022/0050061 A1 | 2/2022 | Bar | |

FOREIGN PATENT DOCUMENTS

| | | | | | |
|---|---|---|---|---|---|
| JP | 2015115504 A | * | 6/2015 | ....... | H01L 21/67288 |
| KR | 1020080028278 A | | 3/2008 | | |
| KR | 1020170100710 A | | 9/2017 | | |
| TW | 202041850 A | | 11/2020 | | |
| TW | 202130994 A | | 8/2021 | | |
| WO | 2013134068 A1 | | 9/2013 | | |
| WO | 2019167151 A1 | | 9/2019 | | |
| WO | 2020035285 A1 | | 2/2020 | | |

OTHER PUBLICATIONS

Korean Intellectual Property Office, International Search Report and Written Opinion for International Application No. PCT/US2023/017007, Jul. 11, 2023, 7 pages.

Korean Intellectual Property Office, International Search Report and Written Opinion for International Application No. PCT/US2023/017008, Jul. 31, 2023, 6 pages.

Korean Intellectual Property Office, International Search Report and Written Opinion for International Application No. PCT/US2023/017001, Jul. 24, 2023, 9 pages.

Hiroi et al. ("Robust Defect Detection System Using Double Reference Image Averaging for High Throughout SEM Inspection Tool," The 17th Annual SEMI/IEEE ASMC 2006 Conference; Date of Conference: May 22-24, 2006) (Year: 2006).

Kim et al. ("Improved Non-parametric Subtraction for Detection of Wafer Defect," 5th International Symposium on Image and Signal Processing and Analysis; Date of Conference: Sep. 27-29, 2007) (Year: 2007).

Amano, "Defect Detection starter (U-Net), Severstal: Steel Defect Detection", Aug. 3, 2019, 25 pages.

Kälber et al., "U-Net based Zero-hour Defect Inspection of Electronic Components andSemiconductors," VISAPP 2021—16th International Conference on Computer Vision Theory and Applications, 2021, 9 pages, SCITEPRESS—Science and Technology Publications, Lda.

Khanmohammadi et al., "A Gaussian mixture model based discretization algorithm for associative classification of medical data," Expert Systems With Applications, Apr. 8, 2016, 11 pages, Elsevier Ltd.

Ren et al., "A Generic Deep-Learning-Based Approach for Automated Surface Inspection," IEEE Transactions on Cybernetics, 12 pages, vol. 48, No. 3, Mar. 2018, IEEE.

Ronneberger et al., "U-Net: Convolutional Networks for Biomedical Image Segmentation," May 18, 2015, 8 pages, Computer Science Department and BIOSS Centre for Biological Signalling Studies, University of Freiburg, Germany.

Salimans et al., "PIXELCNN++: Improving the Pixelcnn With Discretized Logistic Mixture Likelihood and Other Modifications," Conference Paper at ICLR 2017, Jan. 19, 2017, 10 pages.

Van Den Oord et al., "Conditional Image Generation with PixelCNN Decoders," Jun. 18, 2016, 13 pages.

Yamashita et al., "Convolutional neural networks: an overview and application in radiology," Insights into Imaging, Jun. 22, 2018, 19 pages, Springer Nature.

Yun et al., "Automated defect inspection system for metal surfaces based on deep learning and data augmentation," Journal of Manufacturing Systems, May 15, 2020, 8 pages, No. 55, Elsevier Ltd.

Zheng et al., "Recent advances in surface defect inspection of industrial products using deep learning techniques," Survey Paper, The International Journal of Advanced Manufacturing Technology, Jan. 25, 2021, 24 pages, Springer-Verlag London Ltd., part of Springer Nature 2021.

Taiwan Patent Office, Office Action for Taiwan Application No. 112112378 dated Jan. 6, 2026, 22 pages (with translation).

* cited by examiner

302a IMAGE

σ = 8.5147 GL

302b IMAGE

σ = 8.5483 GL

AVERAGE

302c IMAGE

σ = 8.5721 GL

302d IMAGE

σ = 8.5634 GL

304 AVG IMAGE

AVERAGE

σ = 4.324 GL

SHOT NOISE REDUCTION USING FRAME AVERAGING

CROSS-REFERENCE TO RELATED APPLICATION

The present application claims the benefit under 35 U.S.C. § 119(e) of U.S. Provisional Application Ser. No. 63/326,268, filed Mar. 31, 2022, which is incorporated herein by reference in the entirety.

TECHNICAL FIELD

The present invention generally relates to defect inspection, and more particularly to reducing shot noise in defect inspection.

BACKGROUND

Inspection systems are typically used in semiconductor fabrication processes to identify defects of the fabrication process that may result in performance degradation or failure of a fabricated device. As fabricated feature sizes continue to shrink, the sizes of fabrication defects also shrink. This results in weaker measurable signals associated with such defects and lower signal to noise ratios (SNRs) during defect inspection. There is therefore a need to develop systems and methods to address the above deficiencies.

SUMMARY

An inspection system is described, in accordance with one or more embodiments of the present disclosure. In some embodiments, the inspection system includes a controller including one or more processors configured to execute program instructions. In some embodiments, the program instructions cause the one or more processors to receive at least a first portion of a first set of repeat swaths of a first scan path of a sample. In some embodiments, the program instructions cause the one or more processors to generate an image by averaging the first portion of the first set of repeat swaths. Averaging the first portion of the first set of repeat swaths reduces a noise in the image. In some embodiments, the program instructions cause the one or more processors to detect one or more defects in an inspection region of the sample using the image.

In some embodiments, the image is an average inspection image of the inspection region or the image is a reference image.

In some embodiments, wherein the image is the average inspection image. The program instructions cause the one or more processors to receive a plurality of inspection images. The plurality of inspection images are repeated images of the inspection region. The plurality of inspection images includes a first plurality of signal-to-noise ratios. The plurality of inspection images each include the noise contributing to the first plurality of signal-to-noise ratios. The program instructions cause the one or more processors to average the plurality of inspection images to generate the average inspection image. The average inspection image includes a second signal-to-noise ratio. The second signal-to-noise ratio is greater than each of the first plurality of signal-to-noise ratios.

In some embodiments, the inspection system generates the plurality of inspection images in a scanning mode from the first portion of the first set of repeat swaths.

In some embodiments, the program instructions cause the one or more processors to subtract the reference image from the average inspection image to generate a difference image.

In some embodiments, the program instructions cause the one or more processors to detect one or more defects in the inspection region based on the difference image.

In some embodiments, the program instructions cause the one or more processors to apply a difference filter to the difference image to generate a filtered difference image and detect one or more defects in the inspection region based on the filtered difference image.

In some embodiments, the program instructions cause the one or more processors to classify the one or more defects as at least one of a nuisance or a defect of interest.

In some embodiments, the program instructions cause the one or more processors to align the first portion of the first set of repeat swaths before averaging the first portion.

In some embodiments, the program instructions cause the one or more processors to align the first portion using sync interpolation.

In some embodiments, the inspection system includes one or more optical inspection sub-systems. The one or more optical inspection sub-systems generate the first set of repeat swaths of the first scan path. The controller is communicatively coupled to the one or more optical inspection sub-systems.

In some embodiments, the inspection system includes a stage. The stage translates causing the one or more optical inspection sub-systems to generate the first set of repeat swaths of the first scan path.

In some embodiments, the inspection system includes one or more of an encoder or an interferometer. One or more of the encoder or the interferometer are configured to monitor the translation of the stage. The program instructions cause the one or more processors to control the translation of the stage to align the first set of repeat swaths of the first scan path.

In some embodiments, the one or more processors receive at least the first portion of the first set of repeat swaths of the first scan path from the one or more optical inspection sub-systems.

In some embodiments, the one or more optical inspection sub-systems comprise two or more optical inspection sub-systems.

In some embodiments, the one or more optical inspection sub-systems comprise a single optical inspection sub-system.

In some embodiments, the one or more optical inspection sub-systems comprises at least a first optical mode; wherein the one or more optical inspection sub-systems generates the first set of repeat swaths using the first optical mode.

In some embodiments, the first optical mode comprises a first illumination wavelength, a first illumination polarization, and a first illumination angle for the one or more optical inspection sub-systems.

In some embodiments, the image is the average inspection image of the inspection region. The image is also the reference image for a subsequent inspection.

In some embodiments, the first set of repeat swaths comprises at least two repeat swaths. In some embodiments, the first set of repeat swaths comprises between two and four repeat swaths.

In some embodiments, the first set of repeat swaths comprises at least four repeat swaths.

In some embodiments, the image is one image of a plurality of images used to generate a reference image. The program instructions cause the one or more processors to generate the reference image from the plurality of images. The one image is generated by scan averaging. In some embodiments, the inspection region includes one or more patterned features. The plurality of images are from a plurality of reference regions each comprising the one or more patterned features.

In some embodiments, the program instructions cause the one or more processors to receive a second portion of a second set of repeat swaths of a second scan path of the sample and average the second portion of the second set of repeat swaths; wherein the image comprises at least the first portion and the second portion.

In some embodiments, the noise comprises a readout noise or a shot noise.

An inspection system is described, in accordance with one or more embodiments of the present disclosure. In some embodiments, the inspection system includes one or more optical inspection sub-systems. In some embodiments, the inspection system includes a controller communicatively coupled to the one or more optical inspection sub-systems. The controller includes one or more processors to execute program instructions. The program instructions cause the one or more processors to receive at least a first portion of a first set of repeat swaths of a first scan path of a sample. The program instructions cause the one or more processors to generate an image by averaging the first portion of the first set of repeat swaths. Averaging the first portion of the first set of repeat swaths reduces a noise in the image. The program instructions cause the one or more processors to detect one or more defects in an inspection region of the sample using the image.

In some embodiments, the image is an average inspection image of the inspection region, the image is a reference image, or the image is one image of a plurality of images used by the processors to generate the reference image.

In some embodiments, the image is the average inspection image. The program instructions cause the one or more processors to receive a plurality of inspection images. The plurality of inspection images are repeated images of the inspection region. The plurality of inspection images includes a first plurality of signal-to-noise ratios. The plurality of inspection images each include the noise contributing to the first plurality of signal-to-noise ratios. The program instructions cause the one or more processors to average the plurality of inspection images to generate the average inspection image. The average inspection image includes a second signal-to-noise ratio. The second signal-to-noise ratio is greater than each of the first plurality of signal-to-noise ratios.

In some embodiments, the image is the one image of the plurality of images. The program instructions cause the one or more processors to generate the reference image from the plurality of images.

In some embodiments, the inspection region includes one or more patterned features, wherein the plurality of images are from a plurality of reference regions each comprising the one or more patterned features.

A method is described, in accordance with one or more embodiments of the present disclosure. In some embodiments, the method includes receiving at least a first portion of a first set of repeat swaths of a first scan path of a sample. In some embodiments, the method includes generating an image by averaging the first portion of the first set of repeat swaths. Averaging the first portion of the first set of repeat swaths reduces a noise in the image. In some embodiments, the method includes detecting one or more defects in an inspection region of the sample using the image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Figure 1A:
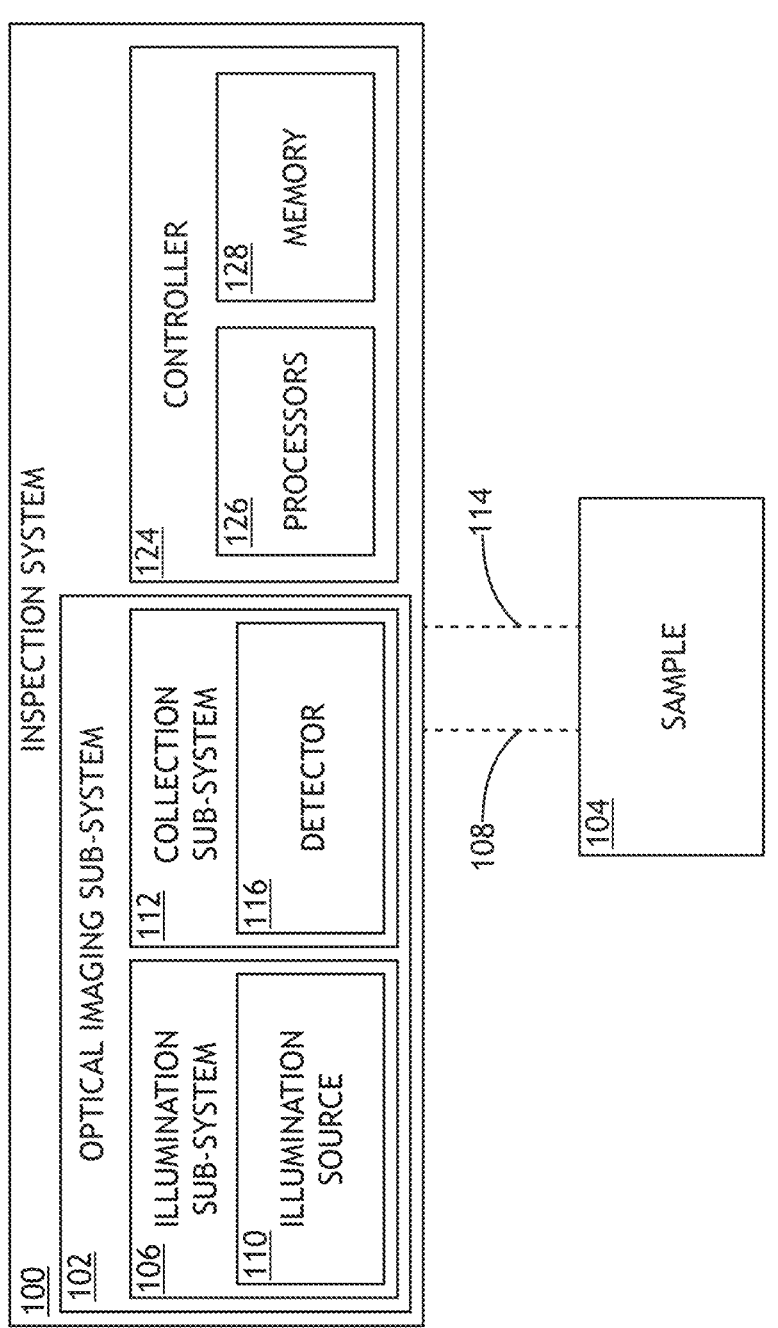
FIG. 1A is a block diagram of an inspection system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to systems and methods for defect inspection with multiple images. The multiple images may be inspection images and/or reference images. The multiple images are repeated images from a region of a sample. The region may be an inspection region and/or a reference region. The region may also be referred to as a swath, a portion of the swath, multiple swaths, or portions of the multiple swaths. The multiple images are averaged to generate an average image of the region. Averaging the images may also be referred to as scan averaging, frame averaging, N-pass averaging, and/or signal averaging. The averaging may occur by adding the intensity values for each common pixel locations and then dividing by the number of images. The average image may be an average inspection image. A reference image is subtracted from the average inspection image to generate a difference image. The difference image may be analyzed for detecting defects in the inspection region of the sample.

Semiconductor devices are typically fabricated using a series of process steps such as, but not limited to, deposition of process layers and/or photoresists, photoresist exposure with a desired pattern, etching of the photoresist and/or underlying process layers, polishing, or the like. Variations of any of these processes, alone or in combination, may lead to variations of fabricated sample features. In a general sense, some sample variations may be acceptable and are deemed nuisances, while others may result in unacceptable performance degradation or device failure and are deemed defects of interest (DOIs).

Inspection tools may be used to inspect a sample for defects after selected process steps. For example, an inspection tool may generate an inspection image of a sample after a particular process step. The inspection image may also be referred to as a test image. Such an inspection image is then typically compared to a reference image to identify defects, where the defects are related to differences between the inspection and reference images. For example, the reference image may be subtracted from the inspection image to generate a difference image, where features in the difference image correspond to sample variations. These sample variations may then be classified as DOIs or nuisances. While various types of inspection tools have been developed, optical inspection tools that generate an image based on illumination with a light source are commonly used for in-line inspection due to the relatively high throughput.

Various conditions may decrease the signal-to-noise ratio (SNR) of defect signals during inspection and thus limit the accuracy or reliability. For example, as the size of fabricated device features shrinks, the size of associated process defects that result in degraded performance or device failure also shrinks. This results in reduced SNR as the feature and/or defect size approaches the resolution limit of an inspection device under even ideal conditions. The reduced SNR may cause the various sources of noise to dominate or hide the defect signals.

One source of noise contributed to the signal-to-noise ratio (SNR) of defect signals during inspection is shot noise. Shot noise may occur due to photon absorption in sensor wells, random variations in photons absorbed, random electrical fluctuations in the sensor, and the like. The shot noise may limit the SNR associated with small defects and/or weak defect signals and thus limit the accuracy and/or reliability of inspection. For example, the shot noise may overwhelm the signal-to-noise ratios of the defect signals due to a size of the fabricated device features. Suppression or reduction of the shot noise is therefore desirable to detect signals of the defects.

Some embodiments of the present disclosure are directed to methods for reducing shot noise in images generated during optical inspection. It is contemplated herein that reducing shot noise in the images may provide superior performance (e.g., discrimination between defects and background signals) than techniques which do not reduce the shot noise. The reduction in shot noise in the images may increase the signal-to-noise ratio (SNR). Patterned features and/or defects may then be distinguishable over the reduced shot noise.

The average image may be any one or more of the images used to generate a difference image. For example, the average image may be an average inspection image. The difference image may be generated by subtracting a reference image from the average inspection image. The average image then introduces less noise into the difference image.

As a result, the defects are distinguishable from the shot noise in the difference image. Thus, the average image may improve a defect capture rate.

U.S. Pat. No. 10,533,848, titled "Metrology and control of overlay and edge placement errors", filed on Aug. 7, 2018; U.S. Pat. No. 11,415,526, titled, "Multi-controller inspection system", filed on Dec. 29, 2020; U.S. Pat. No. 10,535,131, titled "Systems and methods for region-adaptive defect detection", filed on Nov. 14, 2016; U.S. Pat. No. 10,395,358, titled "High sensitivity repeater defect detection", filed on Nov. 6, 2017; U.S. Pat. No. 10,557,802, titled "Capture of repeater defects on a semiconductor wafer", filed on Aug. 13, 2018; U.S. Pat. No. 10,801,968, titled "Algorithm selector based on image frames", filed on Apr. 19, 2019; U.S. Pat. No. 9,518,934, titled "Wafer defect discovery", filed on Nov. 3, 2015; U.S. Pat. No. 11,120,546, titled "Unsupervised learning-based reference selection for enhanced defect inspection sensitivity", filed on Sep. 4, 2020; U.S. Pat. No. 11,416,982, titled "Controlling a process for inspection of a specimen", filed on Sep. 23, 2020; U.S. Patent Publication No. 2021/0010945, titled "Systems and methods for selecting defect detection methods for inspection of a specimen", filed on Jun. 23, 2020; U.S. Pat. No. 11,494,924, titled "Image alignment for noisy images", filed on Nov. 10, 2020; U.S. Pat. No. 10,943,838, titled "Measurement of overlay error using device inspection system", filed on Jun. 24, 2018; U.S. Pat. No. 9,613,411, titled "Creating defect classifiers and nuisance filters", filed on Oct. 2, 2014; U.S. Pat. No. 9,619,876, titled "Detecting defects on wafers based on 2D scatter plots of values determined for output generated using different optics modes", filed on Mar. 12, 2013; U.S. Pat. No. 10,599,944, titled "Visual feedback for inspection algorithms and filters", filed on Nov. 27, 2012; U.S. Pat. No. 10,535,131, titled "Systems and methods for region-adaptive defect detection", filed on Nov. 14, 2016; U.S. Pat. No. 11,551,348, titled "Learnable defect detection for semiconductor applications", filed on Apr. 2, 2020; U.S. Pat. No. 11,550,309, titled "Unsupervised defect segmentation", filed on Jan. 8, 2019; U.S. Pat. No. 9,518,934, titled "Wafer defect discovery", filed on Nov. 3, 2015; U.S. Pat. No. 10,923,317, titled "Detecting defects in a logic region on a wafer", filed on Aug. 18, 2019; U.S. Pat. No. 10,801,968, titled "Algorithm selector based on image frames", filed on Apr. 19, 2019; are incorporated herein by reference in the entirety.

Referring now to FIGS. 1A-4B, systems and methods for optical inspection are described in greater detail, in accordance with one or more embodiments of the present disclosure.

FIG. 1A is a block diagram of an inspection system 100, in accordance with one or more embodiments of the present disclosure.

In one embodiment, the inspection system 100 includes one or more optical imaging sub-systems 102 (e.g., optical imaging tools) configured to generate one or more images of a sample 104, where the one or more optical imaging sub-systems 102 may be configurable to image the sample 104 with multiple optical inspection modes. For example, an optical imaging sub-system 102 may include an illumination sub-system 106 configured to illuminate the sample 104 with illumination 108 from an illumination source 110 and a collection sub-system 112 configured to generate an image of the sample 104 in response to light emanating from the sample (e.g., sample light 114) the illumination 108 using a detector 116.

The sample 104 may include a substrate formed of a semiconductor or non-semiconductor material (e.g., a wafer, or the like). For example, a semiconductor or non-semiconductor material may include, but is not limited to, monocrystalline silicon, gallium arsenide, and indium phosphide. The sample 104 may further include one or more layers disposed on the substrate. For example, such layers may include, but are not limited to, a resist, a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated.

The optical imaging sub-system 102 may generate one or more images of the sample 104 using any technique known in the art. In some embodiments, the optical imaging sub-system 102 is an optical imaging sub-system 102, where the illumination source 110 is an optical source configured to generate illumination 108 in the form of light, and where the collection sub-system 112 images the sample 104 based on light emanating from the sample 104. In some embodiments, the imaging sub-system 102 is a particle imaging sub-system 102, where the illumination source 110 is a particle source configured to generate illumination 108 in the form of particles. For instance, particle illumination 108 may be in the form of an electron beam (e-beam), an ion beam (e.g., a focused ion beam), or a neutral-particle beam. Further, the collection sub-system 112 may image the sample 104 based on particles emanating from the sample 104 (e.g., backscattered electrons, or the like). In some cases, a particle inspection system 100 may also image the sample 104 based on light emanating from the sample 104 in response to the incident particle illumination 108 (e.g., based on photoluminescence, or the like).

Figure 1B:
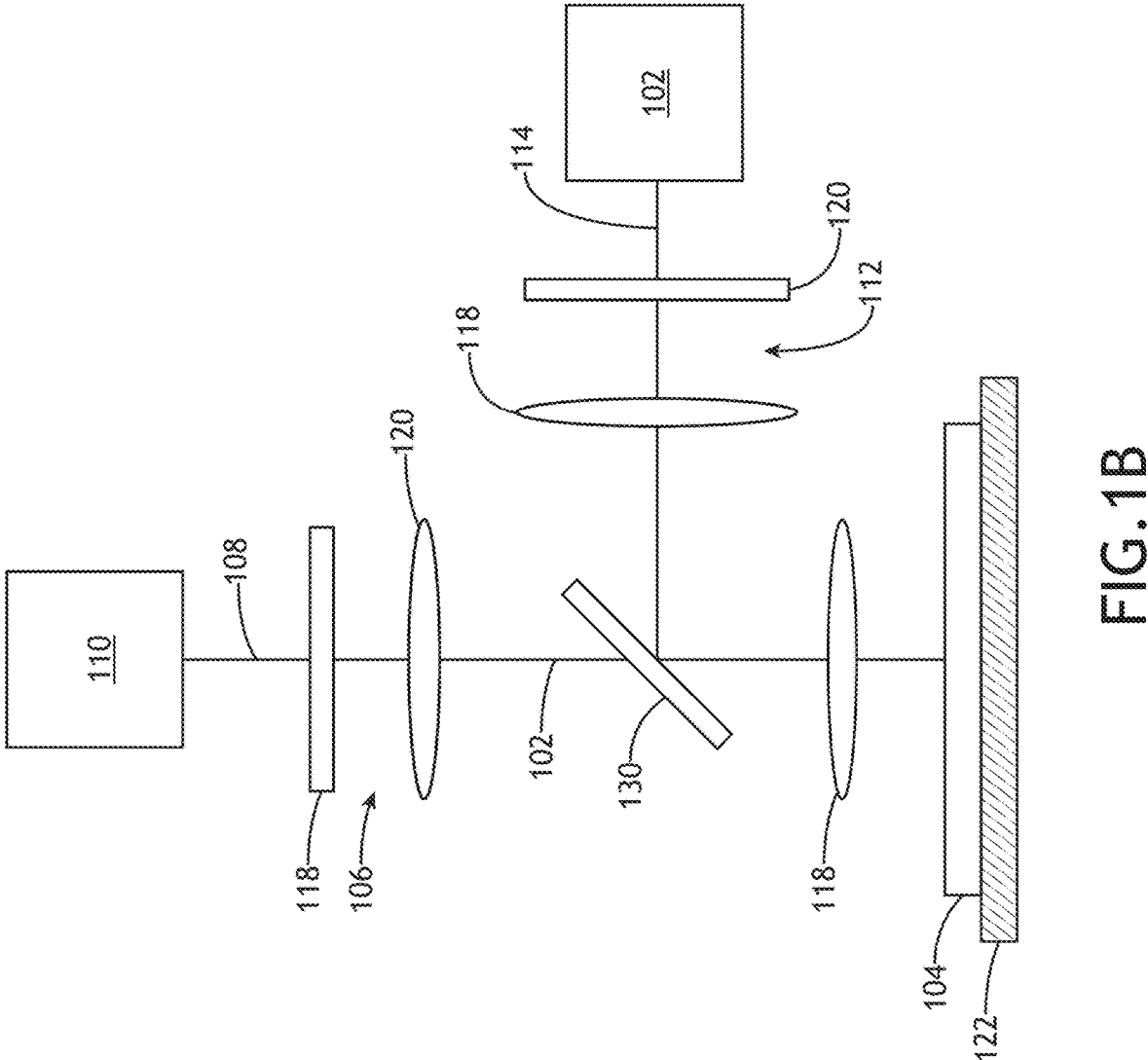
FIG. 1B is a simplified schematic view of an optical inspection system, in accordance with one or more embodiments of the present disclosure.

FIG. 1B is a simplified schematic view of an optical inspection system 100, in accordance with one or more embodiments of the present disclosure.

The illumination source 110 may include any type of illumination source known in the art suitable for generating an optical illumination 108, which may be in the form of one or more illumination beams. Further, the illumination 108 may have any spectrum such as, but not limited to, extreme ultraviolet (EUV) wavelengths, ultraviolet (UV) wavelengths, visible wavelengths, or infrared (IR) wavelengths. Further, the illumination source 110 may be a broadband source, a narrowband source, and/or a tunable source.

In some embodiments, the illumination source 110 includes a broadband plasma (BBP) illumination source. In this regard, the illumination 108 may include radiation emitted by a plasma. For example, a BBP illumination source 110 may include, but is not required to include, one or more pump sources (e.g., one or more lasers) configured to focus into the volume of a gas, causing energy to be absorbed by the gas in order to generate or sustain a plasma suitable for emitting radiation. Further, at least a portion of the plasma radiation may be utilized as the illumination 108.

In another embodiment, the illumination source 110 may include one or more lasers. For instance, the illumination source 110 may include any laser system known in the art capable of emitting radiation in the infrared, visible, or ultraviolet portions of the electromagnetic spectrum.

The illumination source 110 may further produce illumination 108 having any temporal profile. For example, the illumination source 110 may produce continuous-wave (CW) illumination 108, pulsed illumination 108, or modulated illumination 108. Additionally, the illumination 108 may be delivered from the illumination source 110 via free-space propagation or guided light (e.g., an optical fiber, a light pipe, or the like).

The illumination sub-system 106 and/or the optical imaging sub-system 102 may include various components to direct the illumination 108 to the sample 104 such as, but not limited to, lenses 118, mirrors, or the like. Further, such components may be reflective elements or transmissive elements. In this way, the depiction of the lenses 118 in FIG. 1B as transmissive elements is merely illustrative and not limiting. The illumination sub-system 106 may further include one or more optical elements 120 to modify and/or condition light in the associated optical path such as, but not limited to, one or more polarizers, one or more filters, one or more beam splitters, one or more diffusers, one or more homogenizers, one or more apodizers, or one or more beam shapers. In embodiments, the illumination sub-system 106 and/or the optical imaging sub-system 102 includes a beamsplitter 130 oriented to simultaneously direct the illumination 108 to the sample 104 and collect sample light 114 emanating from the sample 104. In this regard, the illumination 108 and the sample light 114 may share the same path between the beamsplitter 130 and the sample 104.

In some embodiments, the inspection system 100 includes a translation stage 122 for securing and/or positioning the sample 104 during imaging. For example, the translation stage 122 may include any combination of linear actuators, rotational actuators, or angle actuators to position the sample 104 using any number of degrees of freedom.

The optical imaging sub-system 102 may include various components to collect at least a portion of the sample light 114 radiation emanating from the sample 104 (e.g., sample light in the case of an optical imaging sub-system 102) and direct at least a portion of the sample light 114 to a detector 116 for generation of an image.

The inspection system 100 may further image the sample 104 using any technique known in the art. In some embodiments, the inspection system 100 generates an image of the sample 104 in a scanning mode by focusing the illumination 108 onto the sample 104 as a spot or a line, capturing a point or line image, and scanning the sample 104 to build up a two-dimensional image. In this configuration, scanning may be achieved by moving the sample 104 with respect to the illumination 108 (e.g., using the translation stage 122), by moving the illumination 108 with respect to the sample 104 (e.g., using actuatable mirrors, or the like), or a combination thereof. The scanning may include scanning the sample 104 along a scan path to generate a swath of the scan path. In some embodiments, the inspection system 100 generates an image of the sample 104 in a static mode by directing the illumination 108 to the sample 104 in a two-dimensional field of view and capturing a two-dimensional image directly with the detector 116.

An image generated by the inspection system 100 may be any type of image known in the art such as, but not limited to, a brightfield image, a darkfield image, a phase-contrast image, or the like. In some embodiments, the images may be raw images from an optical imaging sub-system 102. In this configuration, the inspection images may include various patterned features on the sample. Further, images may be stitched together to form a composite image of the sample 104 or a portion thereof, although this is not intended as a limitation of the present disclosure. Although the images have been described as including the patterned features, this is not intended as a limitation of the present disclosure. It is further contemplated that the images may be from a sample or wafer with no patterned features.

The detector 116 may include any type of sensor known in the art suitable for measuring sample light 114. For example, a detector 116 may include a multi-pixel sensor such as, but not limited to, a charge-couple device (CCD), a complementary metal-oxide-semiconductor (CMOS) device, a line sensor, or a time-delay-integration (TDI) sensor. As another example, a detector 116 may include two or more single-pixel sensors such as, but not limited to, a photodiode, an avalanche photodiode, a photomultiplier tube, or a single-photon detector. In some embodiments, the detector 116 may include the TDI sensor. The TDI sensor may include multiple pixel rows and a readout row. The TDI sensor may include clocking signals that successively move charge from one pixel row to the next until the charge reaches the readout row, where a row of the image is generated. By synchronizing the charge transfer (e.g., based on the clocking signals) to the motion of the sample along the scan direction, charge may continue to build up across the pixel rows to provide a relatively higher signal to noise ratio compared to a line sensor.

In some embodiments, the inspection system 100 includes a controller 124. The controller 124 may include one or more processors 126 configured to execute program instructions maintained on a memory 128 (e.g., a memory medium). In this regard, the one or more processors 126 of controller 124 may execute any of the various process steps described throughout the present disclosure. The controller 124 may be communicatively coupled to the one or more optical inspection sub-systems 102. The controller 124 may receive images from the optical inspection sub-systems 102.

The one or more processors 126 of a controller 124 may include any processing element known in the art. In this sense, the one or more processors 126 may include any microprocessor-type device configured to execute algorithms and/or instructions. In one embodiment, the one or more processors 126 may consist of a desktop computer, mainframe computer system, workstation, image computer, parallel processor, or any other computer system (e.g., networked computer) configured to execute a program configured to operate the inspection system 100, as described throughout the present disclosure. It is further recognized that the term "processor" may be broadly defined to encompass any device having one or more processing elements, which execute program instructions from a non-transitory memory 128.

The memory 128 may include any storage medium known in the art suitable for storing program instructions executable by the associated one or more processors 126. For example, the memory 128 may include a non-transitory memory medium. By way of another example, the memory 128 may include, but is not limited to, a read-only memory, a random-access memory, a magnetic or optical memory device (e.g., disk), a magnetic tape, a solid-state drive, and the like. It is further noted that memory 128 may be housed in a common controller housing with the one or more processors 126. In one embodiment, the memory 128 may be located remotely with respect to the physical location of the one or more processors 126 and controller 124. For instance, the one or more processors 126 of controller 124 may access a remote memory (e.g., server), accessible through a network (e.g., internet, intranet, and the like). Therefore, the above description should not be interpreted as a limitation on the present invention but merely an illustration.

An optical inspection mode may correspond to any combination of parameters used to generate an image of the sample 104 including, but not limited to, properties of illumination directed to the sample 104 or light collected from the sample 104. Further, imaging with different optical inspection modes may generally be performed with any number of optical imaging sub-systems 102.

An optical inspection mode provided by the optical imaging sub-system 102 may be controlled based on control of any combination of components in the illumination sub-system 106 or the collection sub-system 112. For example, control of the illumination 108 directed to the sample 104 may be provided by the illumination source 110 directly and/or by optical elements 120 such as, but not limited to, a spectral filter to control a wavelength of the illumination 108, a polarizer to control a polarization of the illumination 108, or an apodizer (e.g., in an illumination pupil plane) to control an angular distribution of the illumination 108 on the sample 104. As another example, control of the sample light 114 collected from the sample 104 and passed to the detector 116 may be provided by optical elements 120 such as, but not limited to, a spectral filter to control a wavelength of the sample light 114 passed to the detector 116, a polarizer to control a polarization of the sample light 114 passed to the detector 116, or an apodizer (e.g., in a collection pupil plane) to control an angular distribution of the sample light 114 passed to the detector 116.

As an illustration, a particular optical inspection mode may correspond to illumination 108 with a selected spectrum (e.g., as described by a bandwidth and/or a central wavelength) and a selected polarization directed to the sample with a selected incidence angle (e.g., as defined by an illumination aperture or apodizer). The optical inspection mode may further correspond to a particular spectrum and polarization of the sample light 114 directed to the detector 116 (both of which may be the same or different than for the illumination 108 incident on the sample 104).

Further, the illumination source 110 and/or any of the optical elements 120 may be adjustable such that the inspection system 100 may be configured to provide different optical inspection modes. For example, any of the optical elements 120 may be directly tunable and/or controllable by actuators to provide different optical inspection modes. In some embodiments, the controller 124 generates drive signals for the illumination source 110 and/or any of the optical elements 120 to select-ably provide different optical inspection modes.

In embodiments, the optical imaging sub-systems 102 may generate one or more images. The images may include inspection images and reference images, as will be described further herein. In embodiments, the optical image sub-systems 102 may generate the one or more images using one or more optical modes.

Although much of the present disclosure describes images in the context of inspection images and reference images, this is not intended as a limitation of the present disclosure. There is not necessarily a distinction between inspection and reference images. For example, such inspection images and reference images may correspond to independently-generated images or portions of one or more larger images (e.g., may correspond to sub-images of one or more larger images). As an illustration, an inspection image may be associated with a portion of a larger image representative of multiple dies on the sample. In this way, the inspection image may be a sub-image representative of a region of interest that is being inspected for defects at a particular time (e.g., a particular die). As another illustration, a reference image may be generated based on one or more different portions of the larger image associated with different regions on the sample (e.g., additional dies). For example, a reference image may correspond to an average of sub-images associated with one or more additional dies on the sample. In this configuration, a difference image at a particular process step may correspond to a difference between the inspection sub-image image and the reference image (e.g., a combination of sub-images).

It is contemplated herein that defects on a sample may respond differently to imaging with different optical modes such that defect analysis or identification may be improved by considering images generated with different optical modes. Additional embodiments of the present disclosure are directed to inspection systems suitable for performing multi-mode optical inspection. It is contemplated herein that multi-mode inspection may provide substantially superior performance (e.g., discrimination between defects and background signals) than single-mode inspection techniques. Further, increasing the number of inspection modes may generally increase the inspection performance. However, it is further recognized herein that it may be desirable to balance the number of optical inspection modes used during inspection, particularly if such multi-mode inspection requires multiple imaging scans and thus takes longer to perform.

In some embodiments, a single optical imaging sub-system 102 may be configured to image the sample 104 with multiple optical inspection modes simultaneously or sequentially. In some embodiments, different optical imaging sub-systems 102 are used to provide at least some different optical inspection modes.

In some embodiments, the inspection system 100 provides images with different optical inspection modes sequentially. For example, the inspection system 100 may sequentially switch between different optical imaging sub-systems 102 and/or adjust parameters of an optical imaging sub-system 102 to provide sequential images of the sample 104 with different optical inspection modes.

In some embodiments, the optical imaging sub-system 102 may be configured to simultaneously provide two or more images with different optical inspection modes simultaneously. As an illustration, an optical imaging sub-system 102 may include two or more collection channels, each having separate detector 116. The optical imaging sub-system 102 may then have one or more beam splitters to split the sample light 114 into the various channels and/or additional optical elements 120 (e.g., separate spectral filters, polarizers, or the like) to provide separate control of the properties of the sample light 114 directed to the associated detector 116 in each channel.

Figure 2A:
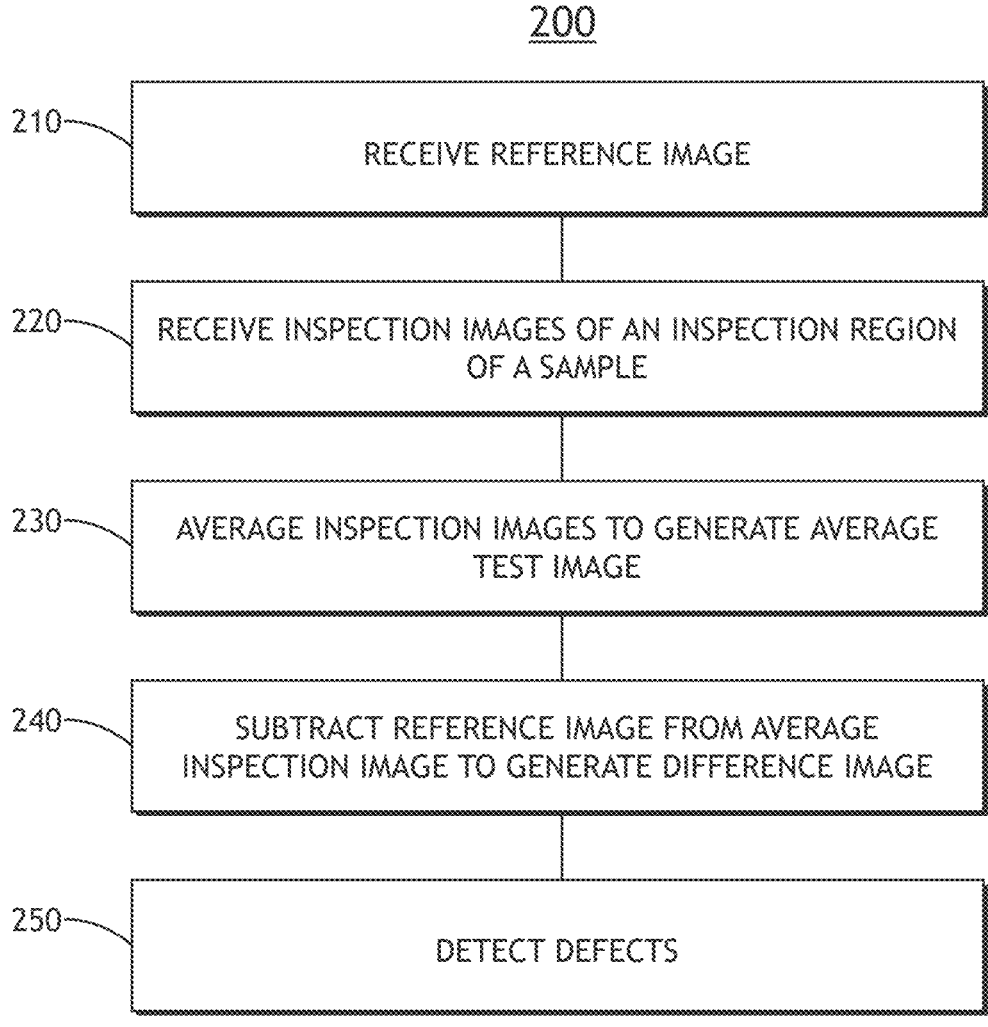
FIG. 2A is a flow diagram illustrating steps performed in an inspection method, in accordance with one or more embodiments of the present disclosure.
Figure 2B:
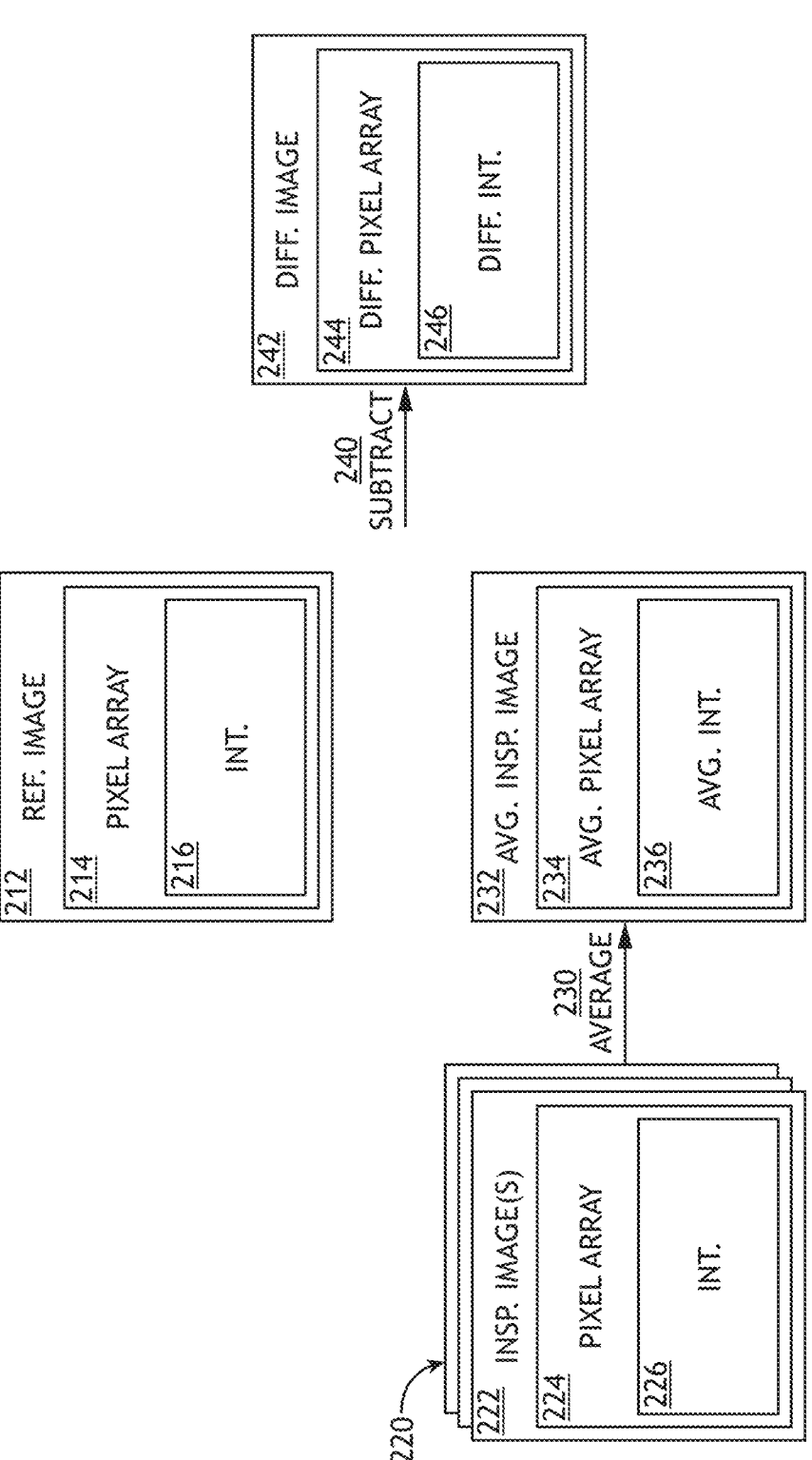
FIG. 2B is a simplified block diagram of images in the flow diagram of the method depicted in FIG. 2A, in accordance with one or more embodiments of the present disclosure.

Referring now to FIGS. 2A-2B, a flow diagram illustrating steps performed in a method 200 is described, in accordance with one or more embodiments of the present disclosure. The embodiments and enabling technologies described previously herein in the context of the inspection system 100 should be interpreted to extend to the method 200. For example, the memory 128 may maintain program instructions which cause the processors 126 to execute one or more steps in the method 200. It is further noted, however, that the method 200 is not limited to the architecture of the inspection system 100.

FIGS. 2A-2B also refers to various images. It is to be understood that such images may be images that are directly generated in one step by the inspection system 100, portions thereof, or composite images formed by stitching sub-images generated by the inspection system 100. Further, images may be cropped or otherwise modified as necessary. In this way, references to images herein are merely illustrative and not limiting on the types of images that may be generated by the inspection system 100.

In some embodiments, the method 200 includes a step 210 of receiving a reference image 212. The program instructions may cause the processors to generate the reference image 212 from a plurality of images of a plurality of regions each comprising a patterned feature. The reference image 212 is generated from the plurality of images. The plurality of images are from a plurality of reference regions which each include a matching patterned feature. The plurality of reference regions may be from the sample 104 and/or from one or more additional samples. The reference region may include a design. For example, the reference region may include a design with one or more patterned features. In some embodiments, the plurality of images used to generate the reference image 212 are averaged to reduce the shot noise. In this regard, the reference image 212 may be generated from averaged images.

In embodiments, the reference image 212 may be received by the one or more processors 126. The inspection system 100 may generate the reference image 212. The reference image 212 may be received by the one or more processors 126 from the optical imaging sub-system 102. The reference image 212 received by the one or more processors 126 may then be maintained in memory 128. The reference image 212 received by the one or more processors 126 may also be received from memory 128.

The reference image 212 may include a pixel array 214. Each pixel in the pixel array 214 may include an intensity 216. The intensity 216 may also be referred to as a signal or a gray level. The intensity 216 may be associated with patterned features in the reference regions, defects in the reference regions, and signals associated with shot noise. The reference image 212 may represent an ideal or reference. It may be assumed that the reference region is defect-free such that the intensity 216 is not associated with any defects, although this is not intended to be limiting.

In some embodiments, the method 200 includes a step 220 of receiving inspection images 222 of an inspection region of a sample 104. The inspection region may include any region on the sample 104 that will be inspected for defects. The inspection region may include a design. For example, the inspection region may include a design with one or more patterned features. The inspection images 222 are repeated images of the inspection region of the sample 104. The repeated images may be taken from the same inspection region using the same optical mode. In this regard, the variable factor between the inspections images 222 may be shot noise.

In embodiments, the inspection images 222 may be received by the one or more processors 126. The inspection system 100 may generate the inspection images 222. The inspection images 222 may be received by the one or more processors 126 from the optical imaging sub-system 102. The inspection images 222 received by the one or more processors 126 may then be maintained in memory 128. The reference images 212 received by the one or more processors 126 may also be received from memory 128.

The inspection images 222 may include a pixel array 224. Each pixel in the pixel array 224 may include an intensity 226. The intensity 226 may be associated with patterned features in the inspection regions, defects in the inspection regions, and signals associated with shot noise. The inspection images 222 may be representative of deviations of a raw image of an inspection region of interest from the reference due to the defects. It may not be assumed that the inspection region is defect-free; rather the inspection region is being inspected for defects. The signals associated with the shot noise may relatively high when compared to the signals associated with the patterned features and/or the signals associated with the defects. In this regard, the shot noise may introduce noise into the patterned features and/or the defects. The inspection images 222 may each include an SNR. The shot noise may contribute to the SNR. The inspection images 222 may thus include a signal-to-noise ratio (SNR) which is relatively low. The SNR of the inspection images 222 may be relatively low such that the defects are hidden by the shot noise.

The inspection images 222 may be aligned, registered, and/or scaled such that they have a common number of aligned pixels. The pixels in the pixel array 224 may correspond to locations on the inspection region of the sample. In this regard, the inspection images 222 may each include a common pixel location in the pixel array 224 which corresponds to a common physical location on the sample. In some embodiments, the step 220 further includes registering and/or scaling the inspection images 222. In this way, the inspection images 222 may have a common number of pixels and each pixel of all inspection images 222 may correspond to a common location on the sample. The registering and/or scaling may also be referred to as aligning the pixels in the pixel arrays 224. In embodiments, the images may be aligned by the processors 126. It is further contemplated that the inspection images 222 may be pre-aligned before receiving the inspection images 222. The aligning may occur by any suitable method of aligning, as will be described further herein.

In some embodiments, the method 200 includes a step 230 of generating an average inspection image 232. The average inspection image 232 may be generated by averaging the inspection images 222 of the one inspection region. The average inspection image 232 may include signals associated with the patterned features, signals associated with defects, and signals associated with the shot noise.

The average inspection image 232 may include an average pixel array 234. The average pixel array 234 may be found by averaging each of the pixel arrays 224 of the inspection images 222. Each pixel in the average pixel array 234 may include an average intensity 236. The average intensity 236 may be found by averaging the intensities 236 between the pixels of each of the inspection images 222. Averaging the intensities 236 may refer to adding the intensity values for each common pixel locations and then dividing by the number of images. The average inspection image 232 may include a SNR. The shot noise may contribute to the SNR. However, the shot noise in the SNR of the average inspection image 232 may be averaged from each of the inspection images 222. The averaging may reduce the shot noise in the average inspection image 232 and similarly increase the SNR. The average inspection image 232 may thus include signal-to-noise ratio (SNR) which is relatively high or greater than each of the SNRs of the inspection images 222. The SNR of the average inspection image 232 may be relatively high such that the defects are not hidden by the shot noise. However, the defects may be hidden by the patterned features.

In some embodiments, the method 200 includes a step 240 of generating a difference image 242. The difference image 242 may be generated by subtracting the reference image 212 from the average inspection image 232. The inspection region and the one or more reference regions have a common design. For example, the inspection region and the one or more reference regions may each include the patterned features. Images from the reference regions may then be used to subtract out the patterned features from the inspection region. The pixels in the pixel array 214 of the reference image 212 may be aligned with the pixels in the average pixel array 234 of the average inspection image 232. In this regard, the pixel array 214 and the average pixel array 234 may be aligned such that the pixels each correspond to the common patterned features. The common patterned features may be aligned between the reference image 212 and the average pixel array 234 by the alignment of the reference image 212 with the average inspection image 232. In some embodiments, the step includes aligning the reference image 212 with the average inspection image 232. In other embodiments, the reference image 212 and the average inspection image 232 are pre-aligned. The aligning may occur by any suitable method of aligning, as will be described further herein.

The difference image 242 may include a difference pixel array 244. The difference pixel array 244 may be found by subtracting the pixel array 214 of the reference image 212 from the average pixel array 234 of the average inspection image 232. Each pixel in the difference pixel array 244 may include a difference intensity 246. The difference intensity 246 may be found by subtracting the intensities 216 between the pixels of the average pixel array 224 from the average intensities 236 between the pixels of the average pixel array 234. The difference image 242 may include a SNR. The signal of the difference image 242 may refer to the intensity of the defects and/or the patterned features and the noise may refer to the shot noise. However, the shot noise and the patterned features may minimally contribute to the SNR. For example, the shot noise may minimally contribute to the SNR by the averaging. By way of another example, the patterned features may minimally contribute to the SNR by the subtraction to find the difference. The subtraction may remove the common features (e.g., the intensity associated with the patterned features). The difference image 242 may thus include signal-to-noise ratio (SNR) which is relatively high. The SNR of the difference image 242 may be relatively high such that the defects are not hidden by the shot noise and/or the patterned features. Improving the SNR may be desirable to improve a detection rate or defect capture rate of the defects in the difference image 242.

In embodiments, the SNR of the reference image 212, the average inspection image 232, and/or the difference image 242 may be defined by the following equation.

$$SNR = (\text{defect contrast}) * \sqrt{\frac{Nwell, v * \text{Number of Repeats}}{\text{Image Dynamic Range}}}$$

$N_{well, v}$ may refer to the well depth in photons of the detector 116. The number of repeats may refer to the number of repeated images which are averaged. Performing the scan averaging may multiply the $N_{well, v}$ term in the above equation by the number of repeated images which are averaged. In this regard, the number of repeated images may reduce the shot noise by the square root of the number of repeated images.

Defect contrast may refer to the contrast between the pixels associated with a defect and the background pixels surrounding the pixels associated with the defect. Defect contrast may be defined by the following equation:

$$\text{Defect Contrast} = \frac{\Delta\text{Image intensity due to Defect}}{\text{Background Image Intensity @ Defect}}$$

Image Dynamic Range may refer to the ratio between maximum and minimum intensity of the image. Image Dynamic Range may be defined by the following equation:

$$\text{Image Dynamic Range} = \frac{\text{Maximum Image Intensity}}{\text{Minimum Image Intensity}}$$

In some embodiments, the method 200 includes a step 250 of detecting one or more of the defects. The defects may be detected based on the difference image 242. The defects may be detected in the inspection region based on the difference image. In some embodiments, the step 250 the defects may be detected directly from the difference image 242.

In some embodiments, the step 250 further includes detecting the defects from a filtered difference image. In embodiments, the controller 124 may be configured to apply a difference filter (diff filter) to the difference image. The difference image is filtered by one or more difference filters. The difference filter may be applied to the difference image 242 to generate the filtered difference image. The difference filter may include, but is not limited to, high pass, low pass, hybrid, narrowband, vertical-direction, horizontal-direction, other selected direction filters, a convolution filter, a digital convolution filter, and the like. In embodiments, the difference filter may be customized to filter difference images determined from scan or frame averaging. For example, the difference filter may be customized with the number of scans used to produce the plurality of images. The defects may then be detected in the inspection region based on the filtered difference image.

The defects may be detected using any technique. In embodiments, the controller 124 may be configured to apply an inspection algorithm to process filtered and/or unfiltered difference images for defect detection. The inspection algorithm may include any inspection algorithm such as, but not limited to, a multiple die adaptive-thresholding (MDAT) and the like.

In some embodiments, the method 200 may include a step of classifying the one or more defects. The defects may generally include defects of interest (DOIs) and/or nuisance defects. The defects of interests may impact device performance, degrade system performance, and/or be killer defects. The nuisance defects generally do not impact device performance. The step may include classifying the defects as at least one of a nuisance, a defect of interest (DOI), or the like.

Although the step 220 is depicted after the step 210 in the flow diagram of the method 200, this is not intended as a limitation of the present disclosure. It is further contemplated the step 220 may be performed before and/or simultaneously with the step 210. In this regard, the inspection images 222 may be generated and then the reference images 212 may be generated; the reference images 212 may be generated and then the inspection images 222 may be generated; or the reference images 212 and the inspection images 222 may be simultaneously generated. Generally, the step 220 may be performed after the step 210. Generally, the step 230 may be performed after the step 220.

In some embodiments, the inspection system 100 generates the reference images 212 and/or the inspection images 222 in a scanning mode. The inspection system 100 may repeatedly scan the reference region to generate the reference images 212 and/or may repeatedly scan the inspection region to generate the inspection images 222.

In some embodiments, the one or more steps of the method 200 may be repeated for multiple optical modes. The optical modes may refer to optical modes of the optical inspection sub-systems 102. The optical inspection mode may include any unique combination of optical imaging parameters of the one or more optical imaging sub-systems 102. For example, the optical inspection modes may include unique combinations of parameters associated with the illumination 108 and/or the sample light 114 used to generate images including, but not limited to, illumination wavelength, polarization, or angle.

The optical inspection sub-systems 102 may generate sets of inspection images of the inspection region of the sample and/or set of reference images of the reference region with the optical inspection modes. The method 200 may be performed for each plurality or set of the reference images 212 and inspection images 222 taken using different optical modes. Images taken at separate modes may be averaged separately. Reference images and average inspection images may then be generated for each of the optical modes. Difference images for each of the optical modes may then be generated by subtracting the reference images and average inspection images. The difference images may then depict the intensity of the defects at each of the optical modes in the inspection region.

For example, the optical inspection sub-systems 102 may be configured to generate a first plurality of inspection images 222 and/or a first plurality of the reference images 212 using a first optical mode. For instance, the first illumination wavelength, a first illumination polarization, and a first illumination angle for the optical inspection sub-systems 102. The processors 126 may receive the first plurality of inspection images and the first reference image, generate a first average inspection image by averaging the first plurality of inspection images 222, and subtract the first reference image from the first average inspection image to generate the first difference image.

By way of another example, the optical inspection sub-systems 102 may be configured to generate a second plurality of inspection images 222 and/or a second plurality of the reference images 212 using a second optical mode. The processors 126 may generate a second average inspection image by averaging the second plurality of inspection images and subtracting the second reference image from the second average inspection image to generate the second difference image.

By way of another example, the optical inspection sub-systems 102 may also be configured to generate any Nth plurality or set of inspection images 222 and/or a Nth plurality or set of the reference images 212 using an Nth optical mode, for any integer N.

In some embodiments, one or more multi-mode inspection techniques may be performed on the difference images. The multi-mode inspection may be designed to reject wafer noise when shot-noise is negligible. The multi-mode inspection techniques may compliment the method 200 when the defect contrast is low and shot noise is a significant fraction of the total noise.

Although the method 200 has been described as being repeated for any number of the optical modes, this is not intended to be limiting. Time requirements may practically limit the number of optical modes when implementing the method 200.

As described previously herein, some optical imaging sub-systems 102 may be capable of generating images with multiple optical inspection modes simultaneously (e.g., via different collection channels), whereas some optical imaging sub-systems 102 may require multiple separate measurements (e.g., scans) to obtain images with different optical inspection modes. In this regard, multiple sets of reference images 212 and/or multiple sets of inspection images 222 may be generated and/or received simultaneously at multiple optical modes. For example, the optical imaging sub-systems 102 may be configured to simultaneously generate the first plurality of inspection images taken at the first optical mode and the second plurality of inspection images taken at the second optical mode. The method 200 may then generate the difference image 242 for each of the optical modes.

In some embodiments, the sample 104 includes a plurality of inspection regions. One or more steps in the method 200 may be repeated for each of the inspection region of the sample 104. For example, the steps 220-250 may be repeated for each inspection region to detect defects in the inspection region. The step 210 may be optionally repeated together with the steps 220-250. For example, the step 210 may or may not be repeated if the current inspection region includes the same patterned features as one or more reference regions in memory 128. The reference image 212 may be received from memory 128 if the inspection region includes the same patterned features as the reference region maintained in memory 128.

Figure 3:
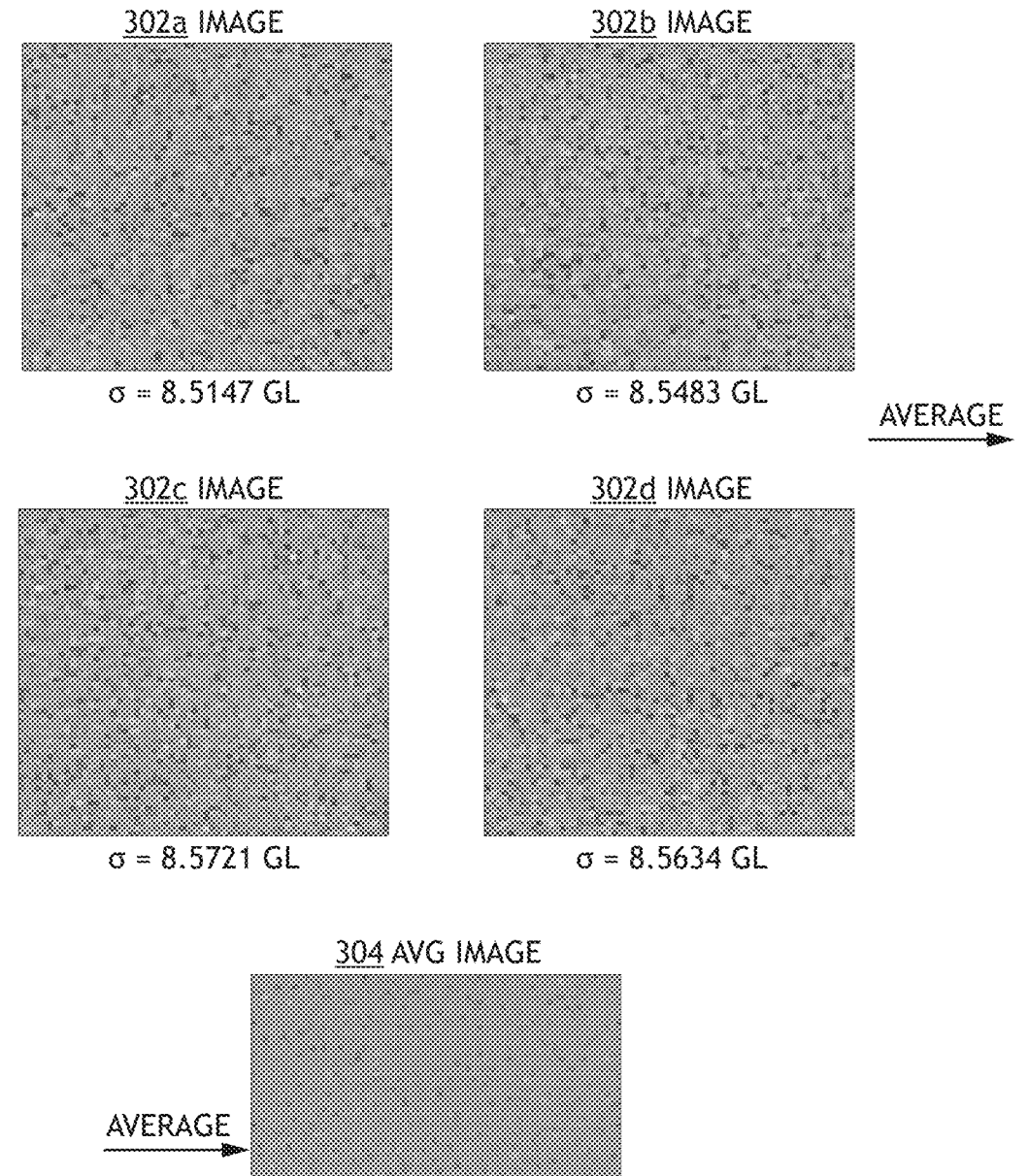
FIG. 3 depicts an example of generating an average image from a set of four images, in accordance with one or more embodiments of the present disclosure.

Referring now to FIGS. 3, a non-limiting example of the application of the method 200 are described. As depicted, images 302a-302d are received. The images 302a-302d are averaged to generate an average image 304. The images 302a-302d and the average image 304 each include a pixel array. Each pixel in the pixel array includes an intensity value. In the example shown, the intensity value is a gray level of the pixel.

As depicted, the images 302a-302d and the average image 304 may include shot noise. The shot noise may be random across the images. For example, the shot noise may be Poisson-distributed or vary randomly in the region. In some embodiments, the images 302a-302d and the average image 304 may each include a standard deviation for the intensity values. The standard deviation for the intensity values may indicate the contribution of the shot noise to the SNR of the images.

The SNR of the average image 304 is substantially higher than the SNRs of each of the images 302a-302d. The image 302a is depicted with a standard deviation of 8.5147 gray-levels, the image 302b is depicted with a standard deviation of 8.5483 gray-levels, the image 302c is depicted with a standard deviation of 8.5721 gray-levels, the image 302d is depicted with a standard deviation of 8.5634 gray-levels, and the average image 304 is depicted with a standard deviation of 4.324 gray-levels. The standard deviation of the average image 304 has been significantly reduced below the standard deviation of the images 302a-302d. For example, the standard deviation of the average image 304 may be on the order of half of the standard deviations of the images 302a-302d because four of the images have been averaged to generate the average image 304.

It is noted that the intensity values of patterned features and defects are not present in the images 302a-302d and not present in the image 304. The intensity values of patterned features and defects are not present in the images 302a-302d, 304 to clearly illustrate the shot noise reduction provided by the averaging. Although not depicted, the images may include intensity values indicative of the patterned features and/or defects.

In some embodiments, the images 302a-302d may be examples of the inspection images 222. Similarly, the average image 304 may be an example, of the average inspection image 232.

In this example, four of the images 302 are received. It is further contemplated that the method 200 may be applied to any number of the images. For example, the inspection images 222 at a given optical mode may include two or more images. By way of another example, the inspection images 222 at a given optical mode may include three or more images. By way of another example, the inspection images 222 at a given optical mode may include four or more images. By way of another example, the inspection images 222 at a given optical mode may include between four and ten images. By way of another example, the inspection images 222 at a given optical mode may include ten or more images. In this regard, any number of repeated images may be averaged to generate the average inspection image 232. The number of repeated images may be selected based on a desired reduction in shot noise weighed against a process time required to generate the repeated images.

Figure 4A:
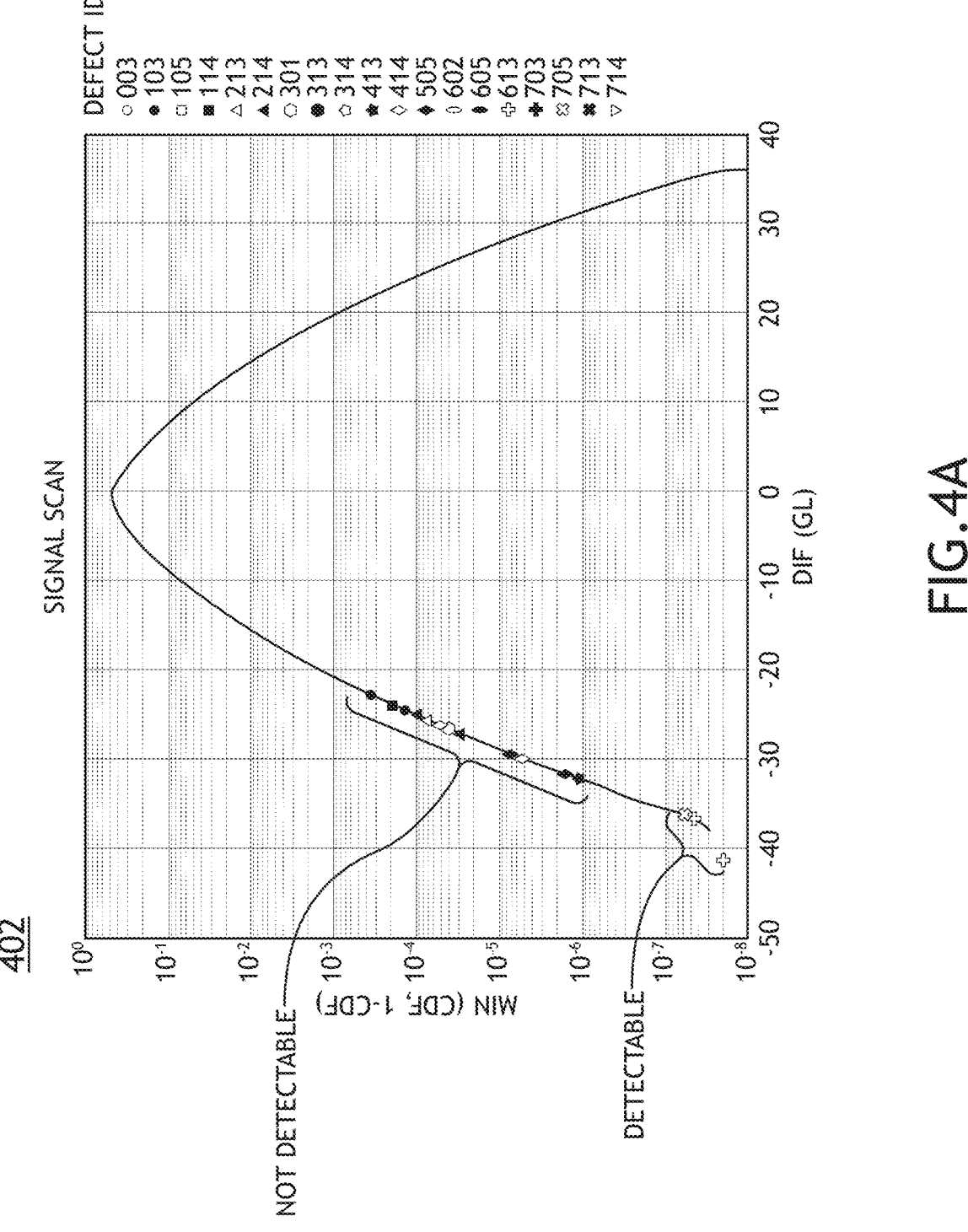
FIGS. 4A-4B depict graphs illustrating improved defect detection in difference images generated from scan averaging, in accordance with one or more embodiments of the present disclosure.
Figure 4B:
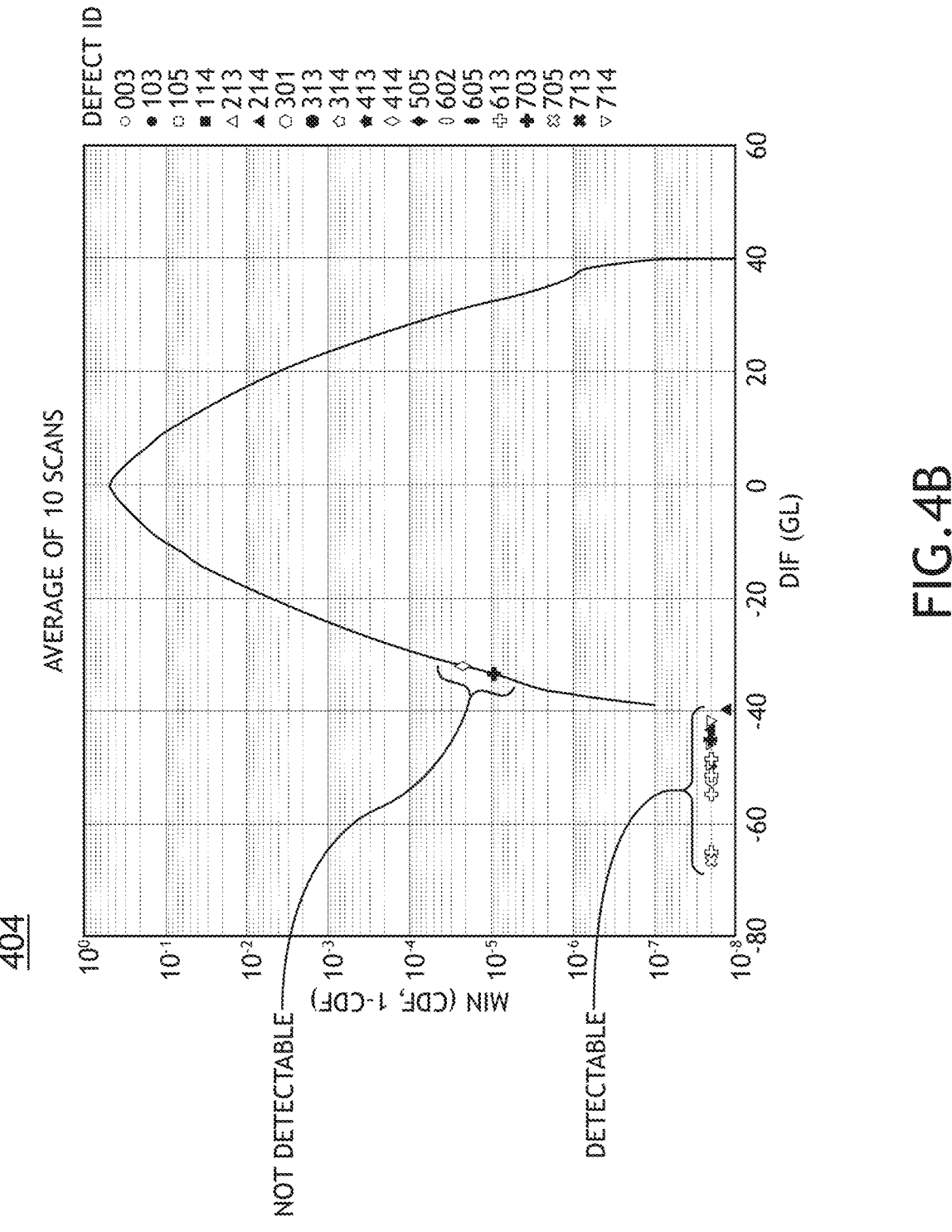

Referring now to FIGS. 4A-4B, graph 402 and graph 404 are described, in accordance with one or more embodiments of the present disclosure. The graph 402 depicts experimental results of a difference image which is formed by subtracting one of the reference images 212 from one of the inspection images 222. In this regard, the difference image referred to in the graph 402 is not formed by subtracting average inspection images 242 and reference image 212. The graph 404 depicts experimental results of a difference image which is formed by subtracting the reference images 212 from the average inspection image 232. For example, the average inspection image 232 may be averaged from ten images or scans.

The graph 402 and the graph 404 are taken from inspection images in the same inspection region. The inspection region includes known defects. The known defects are labelled with defect identifiers. For example, the defect IDs include 003, 103, 105, 114, 213, 214, 301, 313, 314, 413, 414, 505, 602, 605, 613, 703, and 714.

The horizontal axis of the graphs 402, 404 refers to a gray level of a difference image. In particular, the horizontal axis of the graph 402 refers to a gray level of a difference image which has not been averaged from multiple scans. The horizontal axis of the graph 402 refers to a gray level of a difference image which has not been averaged from ten scans.

The vertical axis of the graphs 402, 404 refers to a minimum value between cumulative density function (CDF) and one minus the CDF (e.g., MIN (CDF, 1-CDF)). The vertical axis indicates the probability of the background noise exceeding the difference gray level (horizontal axis) in magnitude. The CDF may refer to a function of background noise.

The N-pass averaging may reduce background acceptance rate in an array region measured by cumulative density function (CDF) of background noise. Ten repeats or less may improve the defect capture rate meaningfully. For example, the graph 402 depicts three of the defects being detectable with the remainder of the defects being undetectable. By way of another example, the graph 404 depicts fourteen of the defects being detectable with the remainder of the defects being undetectable. Thus, the N-pass averaging in this example has improved the defect capture rate from three to fourteen.

Figure 5:
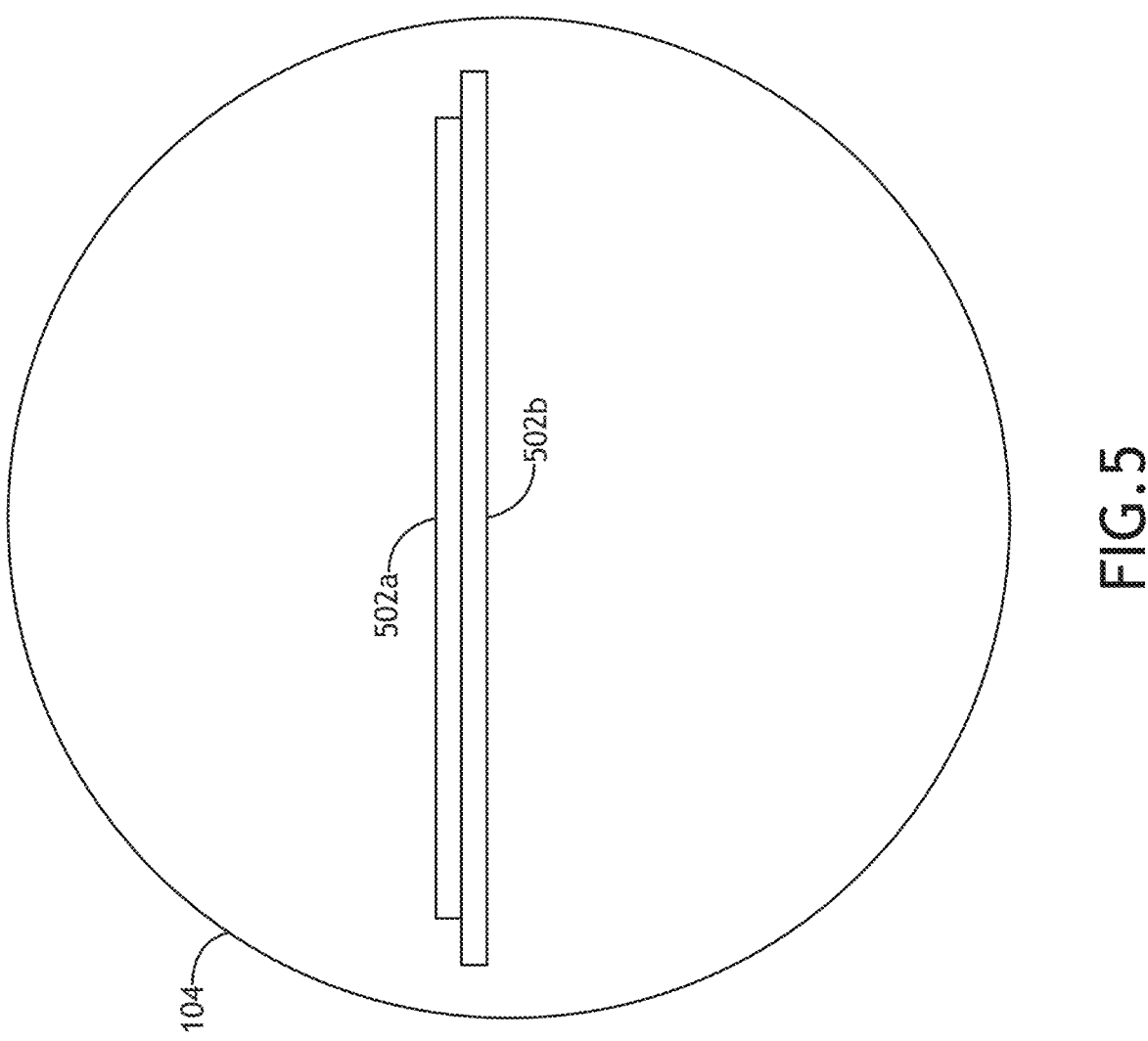
FIG. 5 depicts a sample with scan paths, in accordance with one or more embodiments of the present disclosure.

Referring now to FIG. 5, scanning the sample 104 is described, in accordance with one or more embodiments of the present disclosure. In some embodiments, the images (e.g., the inspection images 222 and/or the reference image 212) may be collected by swathing. Swathing may entail scanning the detector 116 over the sample 104. The detector 116 may be scanned over the sample 104 by translating the stage 122. The detector 116 may scan over the sample 104 in a scan path 502. As depicted, the scan path 502 may be a horizontal direction. The detector may also step in a vertical direction, and scan in a new scan path 502.

The swath may comprise an image that captures a portion of a row of dies on a semiconductor wafer. The swaths may be received and maintained in memory 128. Images of each row of dies may be formed by several swaths. For example, one swath may capture a portion of the area of the row of dies. Multiple of the swaths may then capture multiple portions of the area of the row of dies. The swaths of the row of dies may be aligned to capture images of the dies. The swaths and/or portions of the swaths, may be aligned before averaging. The swaths and/or portions of the swaths may be partitioned into images. For example, a portion of the swaths may define the image. The images may be the inspection images. Defects may be detected in the inspection images. The images may also be one of a plurality of images which are combined to generate the reference image.

In embodiments, the inspection system 100 may generate the repeated swaths of the scan path 502 of the sample 104. For example, the inspection system 100 may generate a first set of repeat swaths of a first scan path 502a of the sample 104, a second set of repeat swaths of a second scan path 502b of the sample 104, and the like. In some embodiments, the number of sets of repeat swaths may be selected to fully image the patterned feature.

In some embodiments, repeat swaths of a scan path are received and then immediately averaged before moving to a next scan path. Immediately averaging the repeated swaths may be advantageous to reduce the amount of the swaths maintained in the memory 128. Immediately averaging the repeat swaths of the scan path may be advantageous when the translation stage 122 can repeat the scan path with a desired accuracy. In some cases the motion of the translation stage 122 is tracked using one or more sensors (e.g., interferometers, encoders, etc.) to achieve the desired accuracy.

In some embodiments, all of the repeat swaths of the scan path are maintained in memory. The portions of the repeat swaths used to generate any of the various images may then be received and averaged. The average swaths may then be stitched together to form the images. Maintaining all of the repeat swaths of the scan path in memory may be advantageous where there are variations in the alignment of the swaths. For example, the alignment may vary in the repeat swaths of the same scan path and/or in the swaths across multiple scan paths. Any of the various swaths may be maintained in memory and then aligned. Maintaining the repeat swaths in memory may require additional memory and/or processing resources.

The processors 126 may receive one or more portions of the sets of repeat swaths of the scan path 502 of the sample 104. The one or more portions may be used to generate the image. For example, the processors 126 receive at least a first portion of a first set of repeat swaths of the first scan path 502a and at least a second portion of a second set of repeat swaths of a second scan path 502b. The processors 126 generate an image by averaging the first portion of the first set of repeat swaths and averaging the second portion of the second set of repeat swaths. The averaging the at least the first portion of the first set of repeat swaths and averaging the at least the second portion of the second set of repeat swaths reduces a shot noise in the image. The processors 126 then detect one or more defects in an inspection region using the image. For example, the image may be the one of the multiple images used to generate the reference image 212. By way of another example, the image may be the average inspection image 232.

Referring generally again to FIGS. 1A-5. A sensor may generate images. A pixel of the sensor can absorb a finite number of photons before the pixel saturates. The saturation of the pixel has to do with the potential well depth of sensors in the sensor. Once the potential well depth is reached, more bits, more photons, and/or more integration time do not reduce shot noise in images generated by the sensor. Defect contrasts smaller than a given percentage may be limited by the well-depth of the sensor. For example, shot noise may fill the well-depth thereby limiting the defect contrasts. The method 200 may improve the defect contrast by reducing the shot noise.

Although much of the present disclosure is described in the context of averaging images to reduce shot noise, this is not intended as a limitation of the present disclosure. It is further contemplated that averaging the images may reduce various sources of random noise, such as, but not limited to, readout noise, shot noise, and the like. The averaging may generally reduce random noise not originating from wafer variations.

As used throughout the present disclosure, one or more images may be aligned. The images may be the inspection images which are aligned before averaging. The images may be the reference image and the average inspection image. The reference image may be aligned with the average inspection image before subtraction. Any suitable approach may be used to align the images to a same coordinate system or origin across inspections. For example, the trajectory of the stage 122 may be monitored by encoders and/or interferometers. The trajectory of the stage 122 may then be controlled by a feedback system so that the trajectory of the repeated images are the same. By way of another example, residual alignment errors may be corrected by an algorithm. The algorithm may shift a first image by an offset using sync interpolation according to Nyquist's theorem. A minimization algorithm may determine the offset that minimizes the sum over pixels of the squares of the differences between the gray values of the shifted first image and a second image. Alignment is preferably performed with sub pixel resolution by an image computer.

As used throughout the present disclosure, the term "sample" generally refers to a substrate formed of a semiconductor or non-semiconductor material (e.g., thin filmed glass, or the like). For example, a semiconductor or non-semiconductor material may include, but is not limited to, monocrystalline silicon, gallium arsenide, indium phosphide, or a glass material. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

In some embodiments, the sample 104 may include one or more regions. The sample 104 may include one or more inspection regions and one or more reference regions on the sample 104. In some instances, the one or more reference regions may be a region on the sample 104 which have a common design with the inspection regions. For example, the inspection regions and the reference regions may each include patterned features. In some embodiments, the inspection regions and the reference regions may be adjacent regions on the sample 104, although this is not intended as a limitation of the present disclosure.

Although the inspection regions and the reference regions are described as being on the sample 104, this is not intended as a limitation of the present disclosure. In other instances, the one or more reference regions may be a region from an additional sample (not depicted) which have a common design with the inspection regions. In this regard, the inspection region may be on the sample 104 and the reference region may be on the additional sample.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
a controller including one or more processors configured to execute program instructions causing the one or more processors to:
receive at least a first portion of a first set of repeat swaths of a first scan path of a sample;
align and scale the first portion of the first set of repeat swaths resulting in a common number of pixels and a common pixel location for each pixel of the first portion of the first set of repeat swaths;
generate an image by averaging the first portion of the first set of repeat swaths; wherein averaging the first portion of the first set of repeat swaths reduces a noise in the image,
wherein aligning the first portion of the first set of repeat swaths occurs before averaging the first portion; and
detect one or more defects in an inspection region of the sample using the image.

2. The inspection system of claim 1, wherein one of:
the image is an average inspection image of the inspection region; or
the image is a reference image.

3. The inspection system of claim 2, wherein the image is the average inspection image; wherein the program instructions cause the one or more processors to:
receive a plurality of inspection images; wherein the plurality of inspection images are repeated images of the inspection region; wherein the plurality of inspection images includes a first plurality of signal-to-noise ratios; wherein the plurality of inspection images each include the noise contributing to the first plurality of signal-to-noise ratios; and
average the plurality of inspection images to generate the average inspection image; wherein the average inspection image includes a second signal-to-noise ratio; wherein the second signal-to-noise ratio is greater than each of the first plurality of signal-to-noise ratios.

4. The inspection system of claim 3, wherein the inspection system generates the plurality of inspection images in a scanning mode from the first portion of the first set of repeat swaths.

5. The inspection system of claim 2, wherein the program instructions cause the one or more processors to subtract the reference image from the average inspection image to generate a difference image.

6. The inspection system of claim 5, wherein the program instructions cause the one or more processors to detect one or more defects in the inspection region based on the difference image.

7. The inspection system of claim 5, wherein the program instructions cause the one or more processors to:
apply a difference filter to the difference image to generate a filtered difference image; and
detect one or more defects in the inspection region based on the filtered difference image.

8. The inspection system of claim 5, wherein the program instructions cause the one or more processors to classify the one or more defects as at least one of a nuisance or a defect of interest.

9. The inspection system of claim 1, wherein the program instructions cause the one or more processors to align the first portion using sync interpolation.

10. The inspection system of claim 2, comprising one or more optical inspection sub-systems; wherein the one or more optical inspection sub-systems generate the first set of repeat swaths of the first scan path; wherein the controller is communicatively coupled to the one or more optical inspection sub-systems.

11. The inspection system of claim 10, comprising a stage; wherein the stage translates causing the one or more optical inspection sub-systems to generate the first set of repeat swaths of the first scan path.

12. The inspection system of claim 11, comprising one or more of an encoder or an interferometer; wherein one or more of the encoder or the interferometer are configured to monitor the translation of the stage; wherein the program instructions cause the one or more processors to control the translation of the stage to align the first set of repeat swaths of the first scan path.

13. The inspection system of claim 10, wherein the one or more processors receive at least the first portion of the first set of repeat swaths of the first scan path from the one or more optical inspection sub-systems.

14. The inspection system of claim 10, wherein the one or more optical inspection sub-systems comprise two or more optical inspection sub-systems.

15. The inspection system of claim 10, wherein the one or more optical inspection sub-systems comprise a single optical inspection sub-system.

16. The inspection system of claim 10, wherein the one or more optical inspection sub-systems comprises at least a first optical mode; wherein the one or more optical inspection sub-systems generates the first set of repeat swaths using the first optical mode.

17. The inspection system of claim 16, wherein the first optical mode comprises a first illumination wavelength, a first illumination polarization, and a first illumination angle for the one or more optical inspection sub-systems.

18. The inspection system of claim 2, wherein the image is the average inspection image of the inspection region; wherein the image is the reference image in a subsequent inspection.

19. The inspection system of claim 1, wherein the first set of repeat swaths comprises at least two repeat swaths.

20. The inspection system of claim 19, wherein the first set of repeat swaths comprises between two and four repeat swaths.

21. The inspection system of claim 1, wherein the first set of repeat swaths comprises at least four repeat swaths.

22. The inspection system of claim 1, wherein the image is one image of a plurality of images used by the processors to generate a reference image; wherein the program instructions cause the one or more processors to generate the reference image from the plurality of images; wherein the one image is generated by scan averaging.

23. The inspection system of claim 22, wherein the inspection region includes one or more patterned features; wherein the plurality of images are from a plurality of reference regions each comprising the one or more patterned features.

24. The inspection system of claim 1, wherein the program instructions cause the one or more processors to receive a second portion of a second set of repeat swaths of a second scan path of the sample and average the second portion of the second set of repeat swaths; wherein the image comprises at least the first portion and the second portion.

25. The inspection system of claim 1, wherein the noise comprises at least one of a readout noise or a shot noise.

26. An inspection system comprising:

one or more optical inspection sub-systems;

a controller communicatively coupled to the one or more optical inspection sub-systems, the controller including one or more processors to execute program instructions causing the one or more processors to:

receive at least a first portion of a first set of repeat swaths of a first scan path of a sample;

align and scale the first portion of the first set of repeat swaths resulting in a common number of pixels and a common pixel location for each pixel of the first portion of the first set of repeat swaths;

generate an image by averaging the first portion of the first set of repeat swaths; wherein averaging the first portion of the first set of repeat swaths reduces a noise in the image, wherein aligning the first portion of the first set of repeat swaths occurs before averaging the first portion; and detect one or more defects in an inspection region of the sample using the image.

27. The inspection system of claim 26, wherein at least one of:

the image is an average inspection image of the inspection region;

the image is a reference image; or the image is one image of a plurality of images used by the processors to generate the reference image.

28. The inspection system of claim 27, wherein the image is the average inspection image; wherein the program instructions cause the one or more processors to:

receive a plurality of inspection images; wherein the plurality of inspection images are repeated images of the inspection region; wherein the plurality of inspection images includes a first plurality of signal-to-noise ratios; wherein the plurality of inspection images each include the noise contributing to the first plurality of signal-to-noise ratios; and average the plurality of inspection images to generate the average inspection image; wherein the average inspection image includes a second signal-to-noise ratio; wherein the second signal-to-noise ratio is greater than each of the first plurality of signal-to-noise ratios.

29. The inspection system of claim 27, wherein the image is the one image of the plurality of images; wherein the program instructions cause the one or more processors to generate the reference image from the plurality of images.

30. The inspection system of claim 29, wherein the inspection region includes one or more patterned features; wherein the plurality of images are from a plurality of reference regions each comprising the one or more patterned features.

31. A method comprising:

receiving at least a first portion of a first set of repeat swaths of a first scan path of a sample;

aligning and scaling the first portion of the first set of repeat swaths resulting in a common number of pixels and a common pixel location for each pixel of the first portion of the first set of repeat swaths;

generating an image by averaging the first portion of the first set of repeat swaths; wherein averaging the first portion of the first set of repeat swaths reduces a noise in the image, wherein aligning the first portion of the first set of repeat swaths occurs before averaging the first portion; and detecting one or more defects in an inspection region of the sample using the image.

32. The inspection system of claim 1, wherein the first portion of the first set of repeat swaths is pre-aligned before receiving the first portion of the first set of repeat swaths of the first scan path of the sample.

* * * * *